May 16, 1950     R. P. SHERRILL     2,507,822
DRIVER'S SAFETY DOOR LOCK
Filed June 24, 1947     2 Sheets-Sheet 1
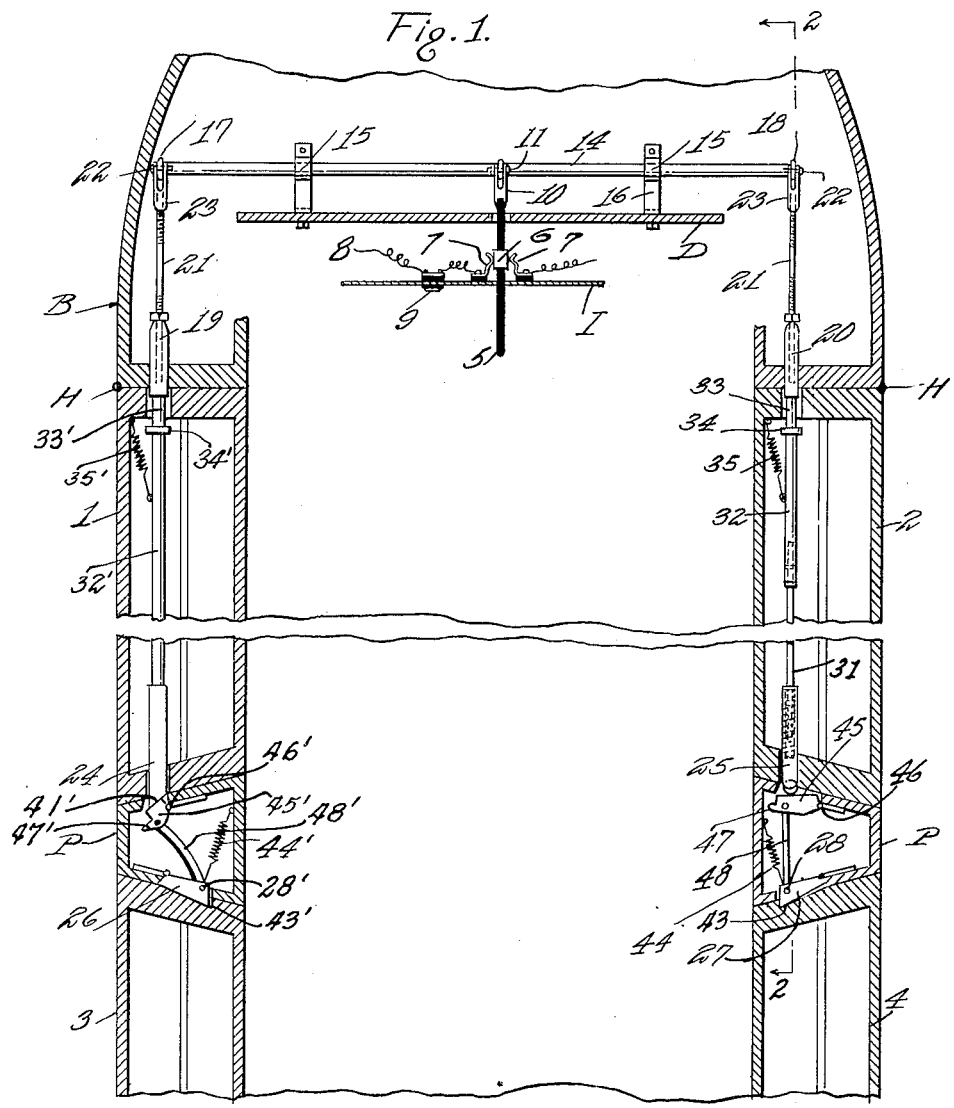
*INVENTOR.*
*R. P. SHERRILL*
BY *Victor J. Evans & Co.*
ATTORNEYS May 16, 1950  R. P. SHERRILL  2,507,822
DRIVER'S SAFETY DOOR LOCK
Filed June 24, 1947  2 Sheets-Sheet 2
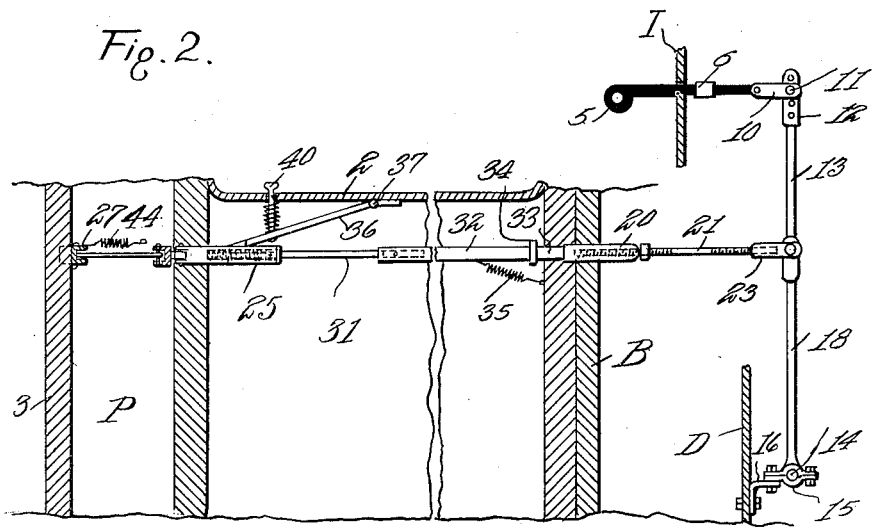
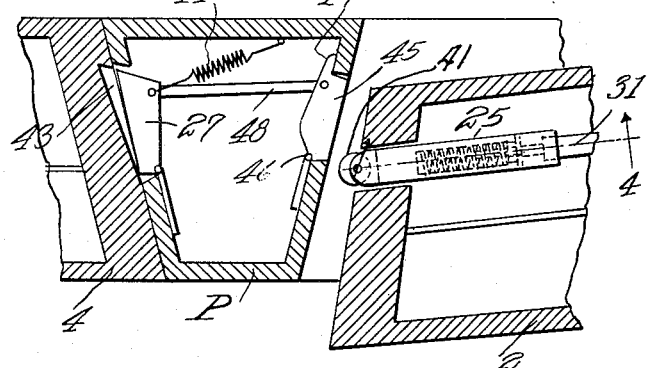
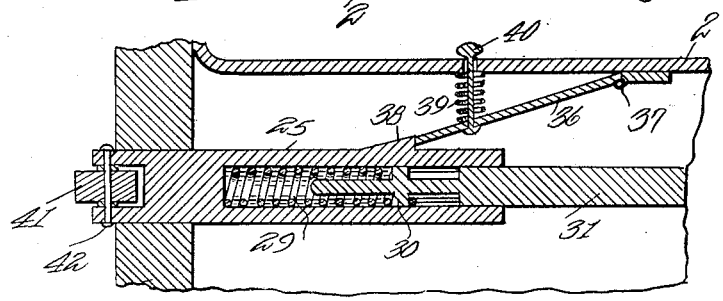
INVENTOR.
R. P. SHERRILL.
BY Victor J. Evans & Co.
ATTORNEYS Patented May 16, 1950

2,507,822

UNITED STATES PATENT OFFICE 2,507,822

DRIVER'S SAFETY DOOR LOCK

Robert P. Sherrill, Los Angeles, Calif.

Application June 24, 1947, Serial No. 756,644

2 Claims. (Cl. 292—5)

My present invention relates to locks for multiple doors of an automobile, and more specifically to a driver's safety door lock involving the combined use of sliding bolts for use with two front doors, and interconnected pivoted bolts for the two rear doors of a four-door automobile.

The primary object of the invention is the provision of a safety locking system for the doors of the vehicle, under control of manually operated means employed in connection with a safety switch in the electrical ignition system of the automotive vehicle, whereby the doors are safely closed and locked when the ignition is turned on, or the ignition circuit is closed and energized for operation of the automobile; and the doors are unlocked by their operating means as the ignition is turned off, or the ignition circuit is opened.

With the installation of my invention in convenient locations in the body and doors of the automobile, the driver of a car, when in driving position, may with convenience, as he turns on the ignition, lock the right front door and the two rear doors to insure the safety of the occupants of the right front seat and the rear seat; and co-acting means are provided at the right side of the vehicle whereby the front and rear doors may simultaneously be unlocked, and the rear door may be closed and locked after the front door has been closed and locked.

The equipment of my invention includes a minimum number of parts that may with facility be manufactured at low cost of production, and assembled with convenience, for easy installation within the desired locations of the automobile, to provide a reliable and efficient safety locking system for the doors of a vehicle.

The invention consists in certain novel features of construction and combinations and arrangements of parts as will hereinafter be described and illustrated in the drawings, and more specifically set forth in the appended claims.

In the accompanying drawings I have illustrated one complete example of a physical embodiment of my invention, in which the parts are combined and arranged in accord with a mode I have devised for the practical application of the principles of the invention.

It will be understood, however, that changes and alterations are contemplated and may be made in these exemplifying drawings and mechanical structures, within the scope of my claims, without departing from the principles of the invention.

Figure 1 is a fragmentary horizontal sectional view showing conventional doors and the body of an automobile, and disclosing a plan view of the interlocking system of my invention with the locking means for the system omitted.

Figure 2 is a fragmentary vertical sectional view, longitudinally of the vehicle, showing the interlocking safety system in elevation, as at line 2—2 of Fig. 1.

Figure 3 is an enlarged, detail horizontal sectional view showing fragments of the right front door and the right rear door, and intermediate post, together with a co-acting slide bolt and pivoted bolt for the respective doors; and Figure 4 is an enlarged, vertical, detail sectional view of a slide bolt, as at line 4—4 of Fig. 3.

In order that the general relation and utility of parts may readily be understood I have designated the four doors of a sedan as 1 for the left front door, or driver's door; 2 as the right front door; 3 as the left rear door; and 4 as the right rear door; the usual posts P, P, being indicated between adjoining doors.

The doors are hinged at H to the body B of the vehicle, and the dash board D and instrument board I are utilized for supporting parts of the equipment of the invention.

By reference to Fig. 1, it will be seen that the interlocking system of bolts is controlled by a manually operated push and pull handle or rod 5 disposed in approximately horizontal position where it is readily accessible to the driver of the car, and passing through openings in the instrument board I and the dash board D. This rod also controls the ignition system 8 of the vehicle, and it is provided with a conductor or contact member 6 that forms a movable contact co-acting with two stationary contacts 7, 7, in the ignition system 8 that includes the usual ignition lock 9. The lock and the stationary contacts are illustrated as mounted on the instrument board, or other suitable support, and as shown, the ignition is turned on and the doors are locked.

As best seen in Fig 2 the operating lever, or push and pull handle 5, at its front end is coupled by a link 10 and pin 11 in a selected hole of a perforated head 12 of an upright rocking bar or lever-arm 13 which at its lower end is pivoted at 14 in a bearing 15 mounted upon an angular bracket 16 that is attached to the dashboard D, or other suitable support. The pivot member 14 is a rock shaft, which is supported in bearings 15, and the shaft extends horizontally across the body B of the car; the opposite ends of the rock shaft being provided with duplicate rock-arms 17 and 18, that project upwardly into position to actuate two complementary interlocking bolt-systems for the pairs of doors at the opposite sides of the vehicle.

At each side of the car, and within the front portion of the body B, two horizontal, longitudinally extending plungers or pushing heads 19 and 20 are slidably mounted, and these internally threaded plungers are adjustable on the rear ends of complementary screw bars or plunger bars 21, 21. At their front ends each of the screw bars is pivoted at 22 by a threaded coupling head 23, 23 to the upper ends of the respective rock arms 17 and 18, in order that as the shaft 14 is rocked by manipulation of the operating handle 5, the plungers may be reciprocated; the plungers moving rearwardly to lock the doors, and forwardly to permit the spring actuated bolts to unlock the doors.

The plungers 19 and 20 are actuated to lock a set of bolts at opposite sides of the vehicle, and these two sets include slide bolts 24 and 25 mounted in the front doors, and two interconnected pivot bolts 26 and 27, pivotally mounted in the posts P, P, for locking the rear doors.

Each of the slide bolts 24, 25, is reciprocably mounted in a door for engagement with a keeper in a post P, and as best seen in Fig. 4 the slide bolt 25 is of tubular form to receive a spring 29, and the spring at its front end is anchored at 30 to a spring rod 31 which telescopes within the tubular bolt. The front end of the spring rod 31 telescopes into the rear end of a tubular impact bar 32 which is provided with an impact head 33, and a stop collar 34 that limits the forward movement of the impact bar as it is slid in a bearing of the front door.

In Fig. 2 it will be seen that this resiliently mounted slide-bolt unit is retracted or projected forwardly to unlocked position by means of a spring, as 35 attached to a portion of one of the front doors, and anchored to the impact bar 32, in order that, when the plunger is retracted, the released slide bolt will also be retracted.

For locking the spring bolt 25 in locked position, the right front door is provided with a detent 36 hinged within the door at 37 and co-acting with a locking lug 38 on the tubular slide bolt 25, and a spring 39 coiled about a pull pin 40 mounted in the upper portion of the door, resiliently retains the detent in locked position. By grasping the exterior head of the pin 40, the pin may be pulled upwardly against tension of the spring to release the slide bolt.

The free end of the slide bolt 25 is equipped with a friction roller 41 journaled on a pin 42 mounted in the end of the bolt, for co-action with the actuating mechanism of the pivoted bolt, or dog 27, that locks the rear door 4.

The pivoted locking bolt 27 is retracted, or withdrawn from its keeper 43 in the rear door, by means of a spring 44 attached to the pivot bolt 27, and anchored to one of the posts P. For projection of the pivoted bolt 27 into locking position with the right rear door, the bolt is alined with the resiliently supported slide-bolt unit in order that the rearward locking movement of the slide bolt unit may be transmitted to the pivoted bolt 27, through the friction roller 41 of the slide bolt 25. For this purpose, the pivoted bolt 27 is provided with a push-arm 45, pivoted at 46 within a post P in position for impact of the roller 41, and a lug 47 of the push-arm limits the outward movement of this push arm.

The push arm is operatively connected with the pivoted bolt at 28 by means of a link 48, and it will be apparent that the pivoted bolt and the pivoted push arm swing in unison on their respective pivots, when the pivot bolt is projected to locking position, as well as when the released pivot bolt is retracted by its spring 44. Referring to Figure 1 it will be noted that the slide bolt 24 is provided with a bevelled face 41' instead of the roller 41. In this instance the impact bar 32' is connected to the plunger 24 and is provided with the impact head 33' and a stop collar 34' as is the impact rod 32. A spring 35' actuates the impact bar 32' in similar fashion to impact bar 32. The face 41' of the bolt 24 co-acts with the pivoted bolt or dog 26 that locks the rear door 3. The pivoted locking bolt 26 being retracted or withdrawn from its keeper 43' in the left rear door by means of a spring 44' attached to the bolt 26 and anchored to one of the posts P. This bolt being actuated in like manner as the bolt 27 by the face 41' of the slide bolt 24. For this purpose the pivoted bolt 26 is provided with a push arm 45' pivoted at 46' within the post P in position for impact with the face 41', and a lug 47' of the push arm limits the outward movement of the push arm. The push arm 45' is operatively connected with the pivot bolt 26 at 28' by means of a link 48' and it will be apparent that the pivoted push arm and pivoted bolt swing in unison on their respective pivots when the pivot bolt 26 is projected to locking position as well as when the released pivot bolt is retracted by its spring 44'.

As thus arranged, the four doors, when closed, may be locked by a pull on the operating handle 5 as the ignition system is turned on; and when the ignition is turned off by a push on the handle, the spring-retracted bolts are unlocked to release the doors; the bolt 25 may be automatically unlocked against the resistance of the spring 29 when the spring pressed detent 36 is lifted from contact with the bolt; and this unlocking movement of bolt 25 also releases the sliding bolt 24 and the spring-retracted pivoted bolts 26 and 27 to unlock the two rear doors, from the inside of the vehicle.

Having thus fully described my invention, what I claim as new and desire to secure by Letters Patent is:

1. In a spring-retracted locking system for hinged side doors of a vehicle body having an intermediate post, the combination with a sliding bolt unit having a resiliently mounted impact-bar and mounted in one door, of manually operated means for projecting the bolt-unit into locked engagement with the post, a rockshaft for said manually operated mechanism having an actuating lever, a lever arm on the rockshaft and a plunger mechanism actuated by the lever arm for coaction with the resiliently mounted impact bar a spring-retracted bolt pivotally mounted in the post for locking engagement with another door, an impact-arm pivotally mounted in the post in the path of the slide bolt unit, a spring pressed detent adapted to coact with said slide bolt unit to retain it in locked position, manually operated means for releasing the detent and an operating link connecting the impact-arm with the pivotally mounted bolt.

2. The invention as in claim 1 wherein said sliding bolt unit comprises a rod connected to the bolt and said resiliently mounted impact bar is provided with a tubular end adapted to telescope over the rod in said slidable unit.

ROBERT P. SHERRILL.

REFERENCES CITED

The following references are of record in the file of this patent:

UNITED STATES PATENTS

| Number | Name | Date |
|---|---|---|
| 1,548,530 | Knight | Aug. 4, 1925 |
| 1,790,104 | Levitt et al. | Jan. 27, 1931 |
| 2,158,736 | Walker | May 16, 1939 |
| 2,242,133 | Kemp | May 13, 1941 |